(No Model.)
J. W. JAMISON.
FODDER FORK.
No. 544,357. Patented Aug. 13, 1895.
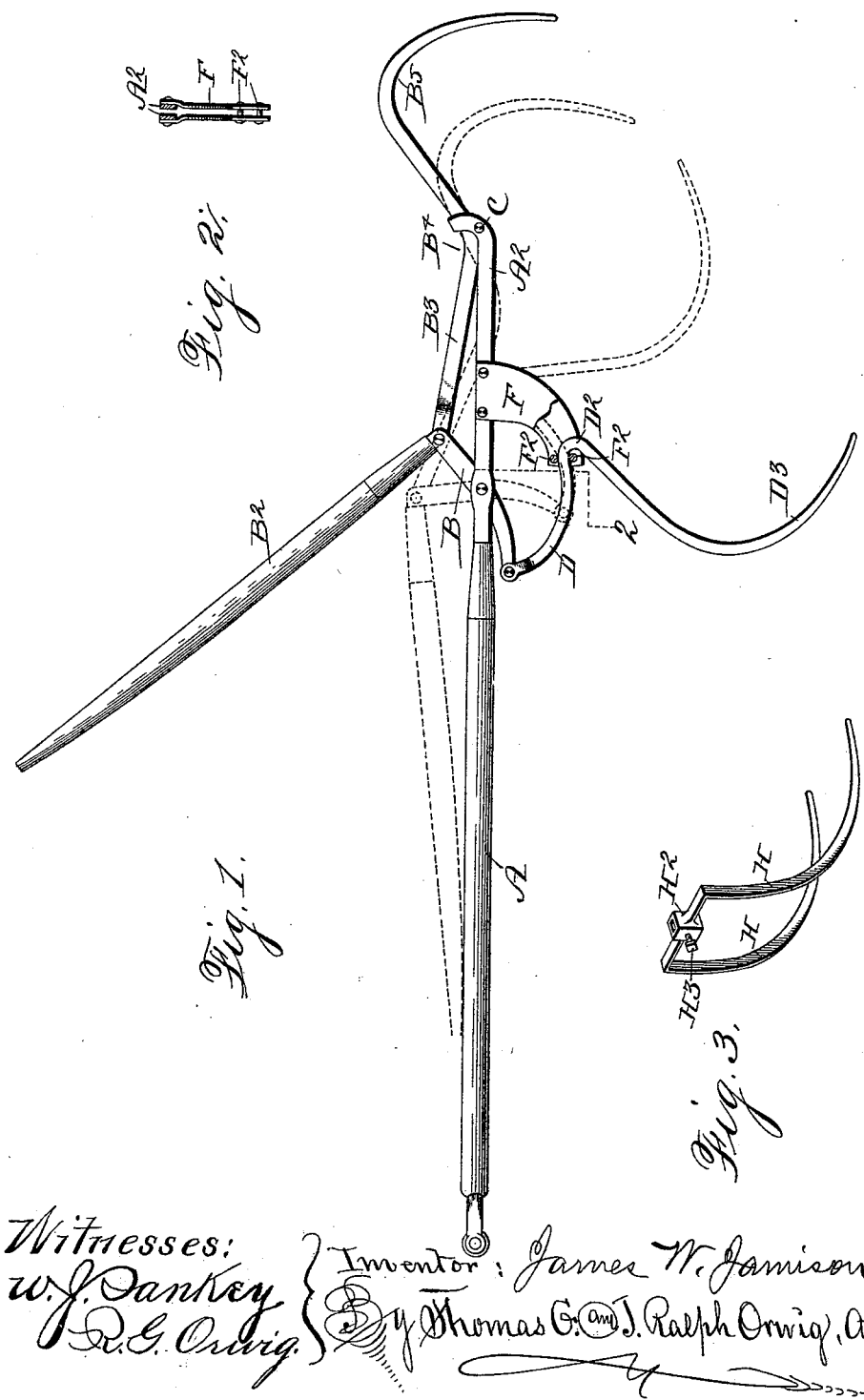

UNITED STATES PATENT OFFICE.

JAMES W. JAMISON, OF ACKWORTH, IOWA, ASSIGNOR OF ONE-THIRD TO D. A. JAMISON, OF SAME PLACE.

FODDER-FORK.

SPECIFICATION forming part of Letters Patent No. 544,357, dated August 13, 1895.

Application filed March 26, 1895. Serial No. 543,210. (No model.)

*To all whom it may concern:*

Be it known that I, JAMES W. JAMISON, a citizen of the United States of America, residing at Ackworth, in the county of Warren and State of Iowa, have invented a new and useful Fodder-Fork, of which the following is a specification.

The object of this invention is to provide a simple, strong, and durable fork for grasping corn-fodder or like substances which must be held between two jaws or tines, and, further, to provide means whereby the jaws or tines may be operated by a single lever and brought forcibly together, so as to firmly engage the fodder by a comparatively-slight pressure on the operating-handle.

My invention consists in certain details in the construction, arrangement, and combination of the various parts of the device, as hereinafter set forth, pointed out in my claims, and illustrated in the accompanying drawings, in which—

Figure 1 is a side elevation of the complete tool, its closed position being illustrated by dotted lines. Fig. 2 is a perspective view showing a fork designed to be clamped to one of the tines. Fig. 3 is a sectional view taken through the dotted line 2.

Referring to the accompanying drawings, the reference-letter A is used to indicate the stationary handle; $A^2$, a flat metal bar doubled at its central portion and curved at right angles and having its ends inserted in the handle A. B indicates a lever fulcrumed between said ends, and having a movable handle $B^2$ fixed in one end thereof.

$B^3$ indicates one of the tines, pivoted in the same end of the lever B and extended straight forwardly and then curved outwardly at $B^4$ and then tapered to a point and curved inwardly at $B^5$. The part $B^4$ is passed through the central portion of the bar $A^2$, and a bolt C is extended through said bar on the side of the tine $B^3$ opposite from the central portion of the bar, so as to guide the movement of the tine. It is obvious that when the tine is forced straight outwardly from the handle, the curved portion $B^4$ engaging the central portion of the bar $A^2$ and the bolt C will cause the end of the tine to move outwardly from the opposite tine. Tines of different sizes may be interchangeably used.

D indicates the opposite tine, pivoted to the remaining end of the lever B and curved at its inner end on a segment having its center in the pivotal point of the lever B, and then curved outwardly in an opposite direction at $D^2$ and inwardly at its end $D^3$ toward the mating tine. This member is guided by means of the curved metal plates F, secured to the bar $A^2$, and having two bolts $F^2$ in its end, between which the tine is passed. It is obvious that as the end of the lever B to which this tine is attached is moved in a direction toward the handle, as when the opposite end is moved from the handle, the outer end of the tine D will be guided in a direction toward the mating tine, and vice versa. Thus a movement of the operating-handle will cause the tines to move in opposite directions or to and from each other. It is obvious, further, that by reason of the long leverage secured by the movable handle the tines may be brought forcibly together and objects between the tines be firmly held.

My invention may further be advantageously used in digging potatoes or other tubers, or in handling articles of less length than corn-fodder, by connecting with each tine a fork H, shaped to conform with the tine and having an angular opening at $H^2$, through which the tine is admitted, and a set-screw $H^3$, by which the fork is clamped to the tine.

In digging potatoes the jaws are first separated, then started into the ground on opposite sides of a "hill," and as the jaws are brought together by pressure upon the movable handle the shape of the forks will cause them to enter into the ground. When the jaws are close together the entire tool is elevated and the potatoes retained within the jaws.

Having thus described my invention, what I claim as new therein, and desire to secure by Letters Patent of the United States therefor, is—

1. A fodder fork comprising a suitable handle, a lever fulcrumed near one end of the handle, tines pivotally connected with the opposite ends of said lever, guides fixed to the handle to admit said tines, and a second handle fixed to said lever, for the purposes stated.

2. A fodder fork, comprising a suitable stationary handle, a flat bar doubled and having its central portion bent at right angles and its ends inserted in the handle, a bolt in said central portion, two plates fixed to the said bar and having two bolts in its ends, a lever fulcrumed between the sides of the bar, a tine or jaw pivoted in each end curved as shown and passed between the guiding bolts, substantially as and for the purposes stated.

JAMES W. JAMISON.

Witnesses:
LILLIE FARLOW,
C. M. CONDIT.